(No Model.)
A. DUBUISSON.
PROCESS OF AND APPARATUS FOR STERILIZING BUTTER, &c.
No. 598,561. Patented Feb. 8, 1898.
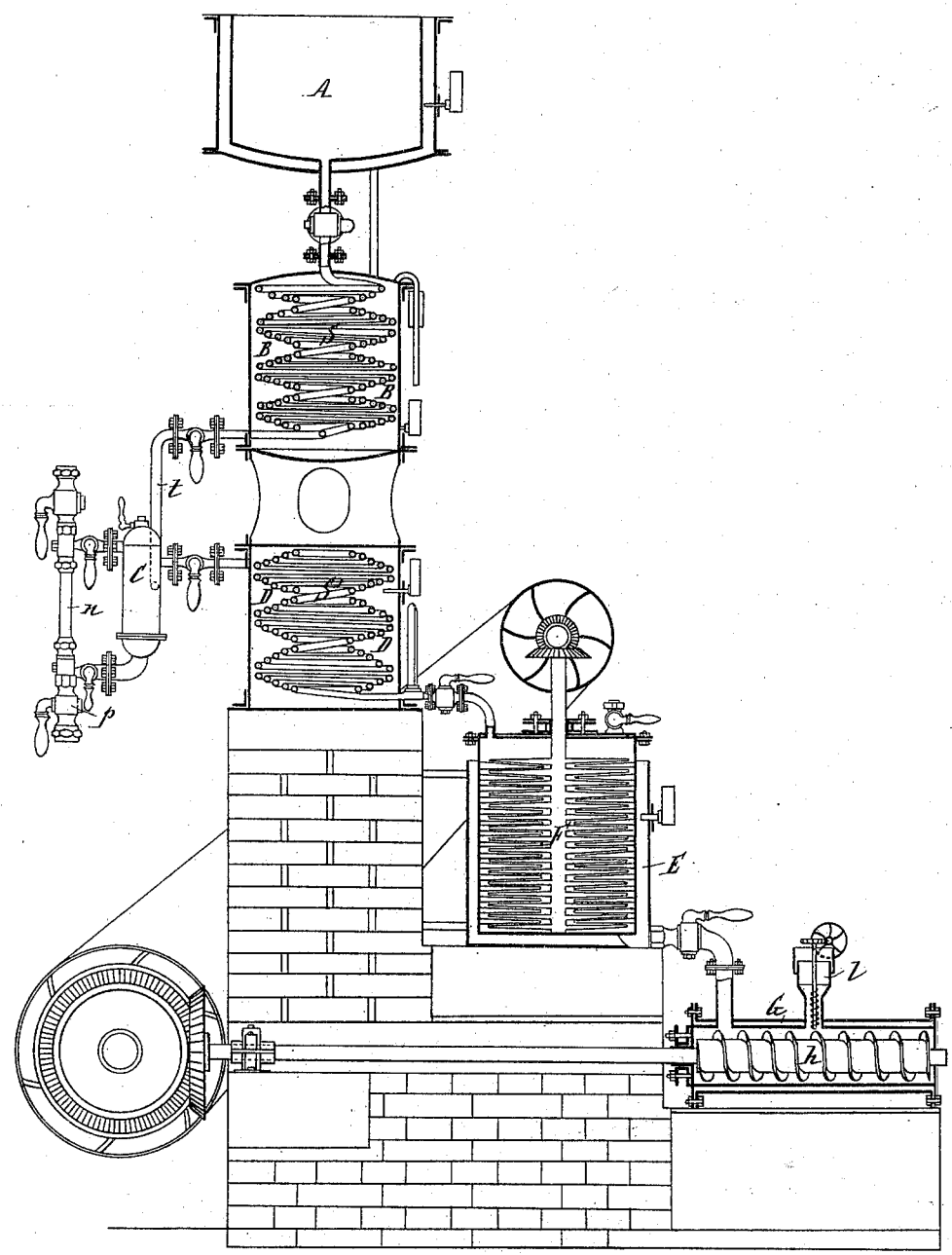

UNITED STATES PATENT OFFICE.

ADONIS DUBUISSON, OF BRUSSELS, BELGIUM.

PROCESS OF AND APPARATUS FOR STERILIZING BUTTER, &c.

SPECIFICATION forming part of Letters Patent No. 598,561, dated February 8, 1898.

Application filed January 20, 1897. Serial No. 619,918. (No model.) Patented in Belgium August 17, 1894, No. 111,427; in France February 16, 1895, No. 245,041; in England March 2, 1895, No. 4,489; in Denmark December 13, 1895, No. 687, and in Switzerland December 23, 1895, No. 11,472.

*To all whom it may concern:*

Be it known that I, ADONIS DUBUISSON, a subject of the King of Belgium, residing at Brussels, Belgium, have invented a new and useful Process of and Apparatus for the Sterilization of Butter and Margarin, (patented in Belgium August 17, 1894, No. 111,427, with patents of improvements dated December 14, 1894, No. 113,196; April 13, 1895, No. 115,059; August 19, 1895, No. 117,035, and August 31, 1895, No. 117,210; in France February 16, 1895, No. 245,041, with certificates of addition of the same number and dated September 12, 1895; in England March 2, 1895, No. 4,489; in Denmark December 13, 1895, No. 687, and in Switzerland December 23, 1895, No. 11,472,) of which the following is a specification.

This invention relates to a process for sterilizing butter and margarin and to apparatus for carrying out such process, the object being to neutralize all the noxious germs in the products to be sterilized and to remove therefrom all foreign matters which are prejudicial to preservation, at the same time retaining the natural taste and aromas of the treated products.

All processes hitherto devised for effecting the sterilization of butter and margarin have given insufficient results. This fact must be attributed to their consisting in effecting the sterilization of the original substance—that is to say, of the milk or cream—before the "manufacture," properly so called, of the butter. The result has been that butter said to be thus sterilized has not been so in reality and could not be preserved, the effects of the previous sterilization of the milk being nullified by the subsequent manufacture of the butter and the manipulation of the product in contact with the air. Moreover, the butter sought to be sterilized by these processes was not freed from foreign matters, such as casein and water, which are prejudicial to the preservation of butter. In order to obviate these objections, I have endeavored to find out a process for operating directly upon the completed products, destroying the noxious germs, such as the microbes of infectious diseases contained in the milk or cream, and removing from such products the matters which are detrimental to preservation without removing their natural aroma and their proper taste. For this purpose I found it necessary to submit the manufactured butter to a temperature of 100° to 110° centigrade and upward without causing the dissipation of the aromas given off by volatilization (this being a result which has not hitherto been attained) to effect the separation of the casein, water, &c., and restore the sterilized products to their original composition, which is partly resolved into its constituent elements by the high temperature to which the products have been submitted. With this object I have devised a process of sterilization which consists, essentially, in melting the products to be sterilized in a hot-water bath and causing them, while protected from contact with the air, to circulate successively, first, in a coil of pipe of a diameter such that the separation of the constituent elements shall not take place through the different densities of the substances in ebullition and in which they are submitted to the necessary sterilizing temperatures; second, in a separating apparatus for removing the foreign matters prejudicial to preservation; third, in a tubular coil for bringing back the sterilized and refined products to a temperature about melting-point, and having consequently for its object to effect a primary reconstitution, which is still imperfect, of the constituent elements; fourth, in a mixing apparatus for completing this reconstitution; fifth, in a refrigerating apparatus for freezing the sterilized products and bringing them into a form favorable to their preservation while protected from contact with the air.

The annexed drawing represents in vertical section the special apparatus which I make use of for carrying out my hereinbefore-described process.

The butter or margarin to be sterilized is heated in a hot-water bath in a double or jacketed vessel A. On leaving this vessel it enters, in a liquid form, the sterilizer S, consisting of a long coil of tin tubing placed in a steam-heated vessel B. In this coil S the products are brought by the circulation of steam in the vessel B to a temperature of 100° to 110° centigrade, which effects the "sterilization," properly so called. The products in ebullition and partly decomposed flow in this coil under the action of the weight. Owing to the diameter of this coil this flow takes place without bringing about a complete separation of the constituent elements, as would be the case if this operation were carried on without circulation and in an ordinary vessel. Moreover, the aromas volatilized and set free under the influence of this high temperature cannot escape. They are carried along with the products and can be subsequently condensed. The sterilization being effected in the coil S, the products reach the separator, formed of a kind of siphon consisting of a tube $t$ and a cylinder C. This siphon is provided at the side with a level-indicator $n$, which will allow of seeing the progress of the operation. The liquefied products on leaving the coil S enter the separator through the tube $t$ and fill the cylinder C. By reason of their different densities, which are greater than those of the constituent elements of the "butter," properly so called, the foreign matters—such as the casein, water, &c.—become deposited in the bottom of the cylinder, whence they are withdrawn through a discharge-cock $p$, while the elements to be preserved continue their circulation through a second coil S', fitted, like the sterilizer, in a steam-heated vessel D. The result of the travel of the liquefied products through the second coil S' under the effect of the circulation at a low temperature which is caused therein is to bring back the products to a temperature about melting-point, so that the products become partly reconstituted at the same time that the condensation of the aromas is effected. The products being thus brought back to a lower temperature, which is nevertheless still sufficiently high to allow them to reach the vessel F, must be submitted to a beating operation in order to complete the reconstitution. This operation is effected by means of the mixer F, mechanically actuated and provided with a cooling-jacket E. In this mixer, which is of any suitable construction, the products are finally reconstituted while being protected from contact with the air. They are brought back to a temperature below melting-point and assume a kind of granular form. The operation cannot yet, however, be considered quite complete. The products so far treated would not be suitable for preservation, as the granular form above mentioned indicates a tendency to become again decomposed. It is necessary in order to bring the product to its final form to freeze it. This operation is carried on in the apparatus G, which is constructed of a cylindrical body having a refrigerating-jacket and in which works a screw $h$ for carrying along the treated products as they leave the mixer F. In this latter apparatus G the butter receives its final form. It can be salted, if desired, by means of an arrangement such as $l$ and delivered in the form of rolls to be immediately placed in boxes for preservation for several years or to be delivered to the consumer.

Having now particularly described and ascertained the nature of my said invention and in what manner the same is to be performed, I declare that what I claim is—

1. The described process for sterilizing butter and margarin, consisting in first melting the same and causing such melted products while protected from contact with the air, to circulate during the sterilization, then separating therefrom prejudicial matters, then condensing the vaporized aromas and the vaporized constituent elements, then reconstituting the products at a lower temperature, and then subjecting the same to a freezing operation while still protected from the air.

2. In apparatus for sterilizing butter and margarin, the combination of a vessel for melting such material in a hot-water bath, a heating apparatus, a sterilizing-coil inclosed therein, a separator composed of a suitable siphon and provided with a discharge-cock, a vessel D, a coil inclosed therein and adapted to be heated to a low temperature at about the melting-point, a mixer provided with a cooling-jacket for effecting the reconstitution of the decomposed products under the influence of heat below the melting-point, and a freezing apparatus adapted for delivering the sterilized products.

In testimony whereof I have signed this specification in the presence of two subscribing witnesses.

ADONIS DUBUISSON.

Witnesses:
GEORGE BEDE,
GREGORY PHELAN.